D. G. DE MILT.
WATER FAUCET.
APPLICATION FILED APR. 24, 1912.
1,054,910.
Patented Mar. 4, 1913.
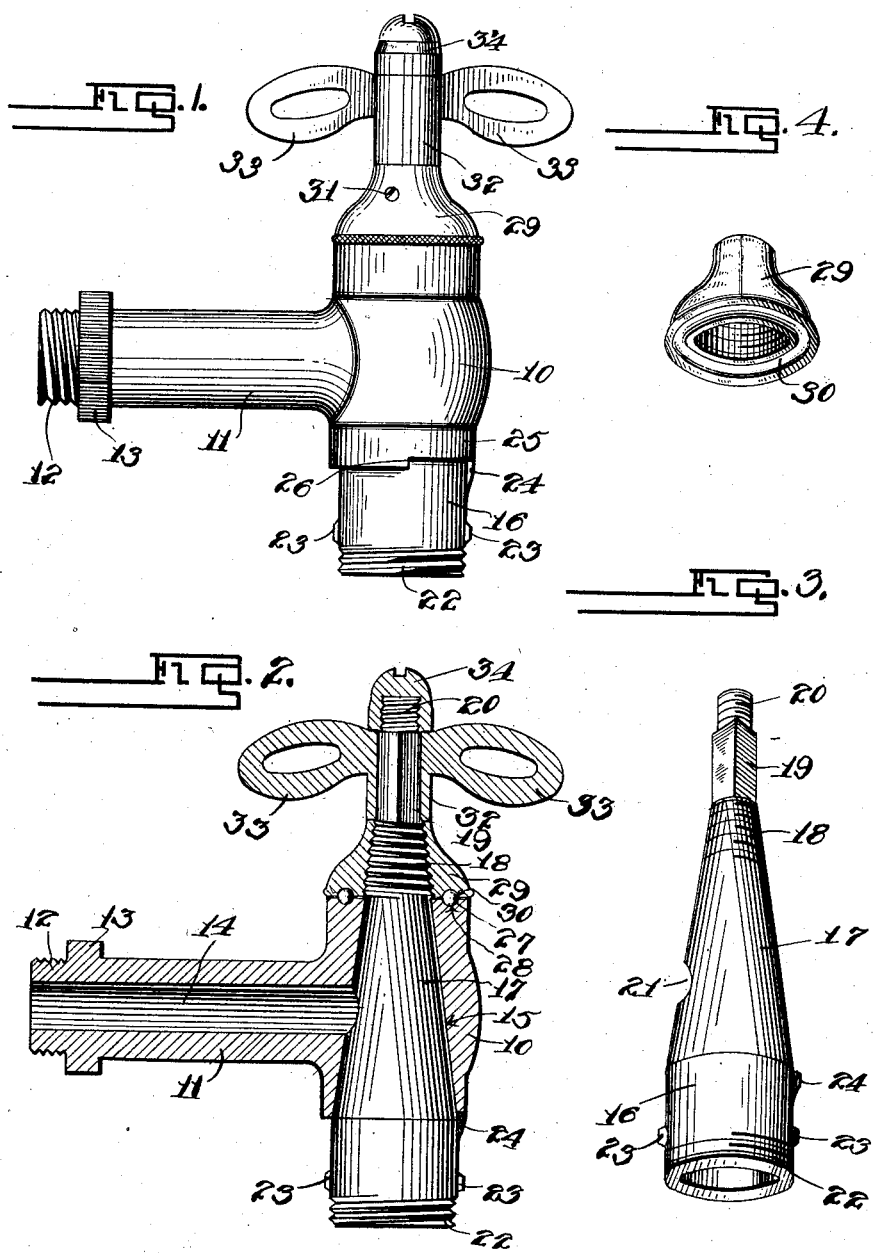

UNITED STATES PATENT OFFICE.

DAVID G. DE MILT, OF TAMPA, FLORIDA, ASSIGNOR OF ONE-HALF TO JULIUS MAAS, OF TAMPA, FLORIDA.

WATER-FAUCET.

1,054,910.  Specification of Letters Patent.  Patented Mar. 4, 1913.

Application filed April 24, 1912. Serial No. 692,798.

*To all whom it may concern:*

Be it known that I, DAVID G. DE MILT, a citizen of the United States, residing at Tampa, in the county of Hillsboro and State of Florida, have invented certain new and useful Improvements in Water-Faucets, of which the following is a specification, reference being had therein to the accompanying drawing.

This invention relates to water spigots and the principal object of the same is to provide a spigot with an improved type of valve in which it is not necessary to provide any rubber or leather washers, thus eliminating the portion of the spigot which usually wears out the quickest.

This spigot comprises a few number of parts which are connected together in such a manner that a tight valve is formed which does not leak and which may be very readily operated.

With the above and other objects in view, the invention consists in general of certain novel constructions, combinations and arrangements of parts, as will be hereinafter fully described, illustrated in the accompanying drawings, and specifically claimed.

Referring to the accompanying drawings, it will be seen that like characters of reference indicate like parts in the several views, and:—Figure 1 is a side elevation of the spigot. Fig. 2 is a vertical sectional view through the spigot. Fig. 3 is a perspective view of the valve cylinder. Fig. 4 is a perspective view of the bearing cap.

This invention comprises a hollow body portion 10 from which extends an inlet 11, which has its end portion 12 threaded, and which is provided with the shoulder 13 provided with the flat faces so that the spigot can be screwed into a coupling. This inlet 11 is provided with a longitudinally extending passage way 14 which communicates with the central opening 15 of the body portion 10. The valve cylinder, shown in Fig. 3, fits into the body portion 10 and comprises a cylindrical lower portion 16 which merges into the tapered central portion 17. The upper portion 18 of the tapered portion of the cylinder is threaded and the upper portion of the valve terminates in the rectangular portion 19 and threaded end 20. The portions 16 and 17 of the valve cylinder are hollow, the portion 17 being provided with an opening 21 adapted to register with the passage way 14 so that when turned to the position shown in Fig. 2 water may pass through the passage way and into the cylinder. The lower portion 22 of the cylinder is threaded so that a hose may be connected with the valve, and lugs 23 are formed just above the threaded portion 22 to form stops for the coupling of the hose. A stop 24 is formed upon the cylindrical portion 16 of the valve cylinder and is in contact with the edge of the lower portion 25 of the body portion 10. This lower portion 25 has one portion cut away to form a shoulder 26 which limits the movement of the valve. After the valve has been inserted in the body portion, ball bearings 27 are placed in the bearing race 28 formed in the upper portion of the body portion and a cap 29 is screwed upon the threaded portion 18 so that the ball bearings fit into the bearing race 30 formed in the lower edge of the cap 29. The cap 29 acts as an adjusting means for the valve cylinder so that the tightness with which the valve cylinder fits into the body portion may be regulated. It should be noted, however, that the ball bearings 27 cause the spigot to work easily when the valve is drawn tightly into place. After the valve has been adjusted to the desired place the screw 31 is screwed tight, and this holds the cap in the desired position. A handle which comprises the sleeve 32 and arm 33 is placed upon the rectangular portion 19 and is held in place by the cap 34 which is screwed upon the threaded portion 20.

It will thus be seen that after the spigot has been assembled as described the parts fit tightly in place, and although the spigot may be easily turned on there is no possibility of any of the parts wearing out so that the spigot is caused to leak. If, however, the valve cylinder wears slightly it is a simple matter to release the set screw 31, tighten the cap 29, and then retighten the set screw so that the valve cylinder will be again tightly seated in the body portion.

There has thus been provided a simple and efficient device of the kind described and for the purpose specified.

Having thus described the invention, what is claimed as new, is:—

A spigot comprising a body portion provided with a longitudinally extending conical opening, a hollow inlet arm extending from said body portion, a valve plug passing through said body portion, the inner portion of said plug being conical and the lower portion being cylindrical and terminating in a threaded end, abutment lugs at the upper end of the threaded end of said plug, the upper end portion of said plug being formed into a stem threaded for a portion of its length and being then reduced and terminating in a threaded end, a disk threaded upon said stem, bearing balls between said disk and body portion, a handle rigidly mounted upon said stem above said disk, and a securing nut threaded upon the reduced threaded end of said stem to hold said handle in place.

In testimony whereof I hereunto affix my signature in presence of two witnesses.

DAVID G. DE MILT.

Witnesses:
JULIUS WEIL,
A. RODRIGUEZ.